(12) United States Patent
Parris et al.

(10) Patent No.: US 7,786,050 B2
(45) Date of Patent: *Aug. 31, 2010

(54) WELL TREATMENT WITH IONIC POLYMER GELS

(75) Inventors: Michael D. Parris, Richmond, TX (US); Andrey Mirakyan, Houston, TX (US); Yiyan Chen, Sugat Land, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/116,759

(22) Filed: May 7, 2008

(65) Prior Publication Data

US 2008/0280788 A1 Nov. 13, 2008

Related U.S. Application Data

(60) Provisional application No. 60/928,812, filed on May 11, 2007.

(51) Int. Cl.
*C09K 8/68* (2006.01)
*C09K 8/60* (2006.01)
*C09K 8/524* (2006.01)

(52) U.S. Cl. .................. 507/211; 507/209; 507/239; 507/240; 507/273

(58) Field of Classification Search .................. 501/211, 501/209, 239, 240, 273
See application file for complete search history.

(56) References Cited

U.S. PATENT DOCUMENTS

| | | | |
|---|---|---|---|
| 3,692,676 | A | 9/1972 | Cutler et al. |
| 4,480,696 | A | 11/1984 | Almond et al. |
| 4,514,309 | A | 4/1985 | Wadhwa |
| 4,579,670 | A | 4/1986 | Payne |
| 4,627,495 | A | 12/1986 | Harris et al. |
| 4,686,052 | A | 8/1987 | Baranet et al. |
| 4,780,223 | A | 10/1988 | Baranet et al. |
| 4,808,739 | A | 2/1989 | Putzig et al. |
| 4,885,103 | A | 12/1989 | Putzig et al. |
| 4,960,527 | A | 10/1990 | Penny |
| 5,165,479 | A | 11/1992 | Harris et al. |
| 5,217,632 | A | 6/1993 | Sharif |
| 5,259,455 | A | 11/1993 | Nimerick et al. |
| 5,330,005 | A | 7/1994 | Card et al. |
| 5,420,174 | A | 5/1995 | Dewprashad |
| 5,439,059 | A | 8/1995 | Harris et al. |
| 5,529,122 | A | 6/1996 | Thach |
| 5,551,516 | A | 9/1996 | Norman et al. |
| 5,575,335 | A | 11/1996 | King |
| 6,214,773 | B1 | 4/2001 | Harris et al. |
| 6,227,295 | B1 | 5/2001 | Mitchell et al. |
| 6,239,183 | B1 | 5/2001 | Farmer et al. |
| 6,435,277 | B1 | 8/2002 | Qu et al. |
| 6,482,866 | B1 | 11/2002 | Dahayanake et al. |
| 6,506,710 | B1 | 1/2003 | Hoey et al. |
| 6,703,352 | B2 | 3/2004 | Dahayanake et al. |
| 6,810,959 | B1 | 11/2004 | Qu et al. |
| 6,844,296 | B2 | 1/2005 | Dawson et al. |
| 7,001,872 | B2 * | 2/2006 | Pyecroft et al. ............. 507/211 |
| 7,082,995 | B2 * | 8/2006 | Hanes et al. ................ 166/279 |
| 7,287,593 | B2 | 10/2007 | Hutchins et al. |
| 7,303,018 | B2 | 12/2007 | Cawiezel et al. |
| 2004/0209780 | A1 | 10/2004 | Harris et al. |
| 2005/0077044 | A1 | 4/2005 | Qu et al. |
| 2006/0225884 | A1 | 10/2006 | Harris et al. |
| 2006/0229213 | A1 | 10/2006 | Harris et al. |
| 2006/0234872 | A1 * | 10/2006 | Mirakyan et al. ........... 507/211 |
| 2007/0087940 | A1 | 4/2007 | Qu et al. |

FOREIGN PATENT DOCUMENTS

| | | | |
|---|---|---|---|
| WO | 0034382 | A1 | 6/2000 |
| WO | 03050387 | A2 | 6/2003 |
| WO | 2008068467 | A1 | 6/2008 |

OTHER PUBLICATIONS

Harry, D.N., Moorhouse, R., Matthews, L., Chen, G. Rheological Responses to Variations in Aqueous-Based Zirconium Crosslinker Chemistry. SPE 37280 (1997) p. 669-674.

Yaritz, J., Stegent, N., Bailey, T. Fritcher, E. Development of a Dual Crosslinker Fracturing Fluid System. SPE 38959 (1997).

Rose, J. et al. Aqueous Zirconium Complexes for Gelling Polymers. A Combined X-ray Absorption Spectroscopy and Quantum Mechanical Study. J. Phys. Chem. B 2003, 107, 2910-2920.

Omari, A. Gelation Control of the Scleroglucan-Zirconium Systems using Oxyacids. Polymer, vol. 36, No. 22, pp. 4263-4265. 1995 Elsevier Science Ltd.

\* cited by examiner

*Primary Examiner*—Timothy J. Kugel
*Assistant Examiner*—Atnaf Admasu
(74) *Attorney, Agent, or Firm*—David Cate; Rachel E. Greene; Robin Nava

(57) ABSTRACT

Methods comprising preparing an aqueous mixture of an anionic polymer, a charge screening surfactant, and a borate crosslinker, wherein the mixture has a conductivity less than 10 mS/cm, injecting the mixture down a wellbore, and gelling the mixture. An embodiment of the aqueous mixture can also include tetramethylammonium chloride as a clay stabilizer and a metal crosslinker such as a complex of zirconium and an amino acid ligand system. An embodiment can effectively provide borate crosslinking of an anionic polymer in a low-ionic-strength fluid system, without sacrificing ultimate gel strength or thermal persistence of the metal crosslinked polymer.

25 Claims, 3 Drawing Sheets

WELL TREATMENT WITH IONIC POLYMER GELS

CROSS REFERENCE TO RELATED APPLICATION

This application claims priority to and the benefit of U.S. 60/928,812, filed May 11, 2007.

BACKGROUND

The statements in this section merely provide background information related to the present disclosure and may not constitute prior art.

Disclosures relate to compositions and methods for treating subterranean formations, in particular, oilfield stimulation compositions and methods using ionically modified polymer crosslinked with a borate source to viscosify the treatment fluid.

High volumes of formation fracturing and other well treatment fluids are commonly thickened with polymers such as guar gum, the viscosity of which is greatly enhanced by crosslinking with boron and/or a metal such as chromium aluminum, hafnium, antimony, etc., more commonly a Group 4 metal such as zirconium or titanium. In reference to Periodic Table "Groups," the new IUPAC numbering scheme for the Periodic Table Groups is used herein as found in Hawley's Condensed Chemical Dictionary, p. 888 (11th ed. 1987). Sometimes guar is modified with ionic groups to facilitate hydration of the polymer and to improve crosslinking with metal complexes. Ionic modification of the polymers can reduce the time it takes to dissolve the dry polymer at the well site, and improve both the ultimate gel strength and the thermal persistence of the gel upon crosslinking with a metal crosslinking complex.

It is well known that metal-crosslinked polymer fluids can be shear-sensitive after they are crosslinked. In particular, exposure to high shear typically occurs within the tubulars during pumping from the surface to reservoir depth, and can cause an undesired loss of fluid viscosity and resulting problems such as screenout. As used herein, the term "high shear" refers to a shear rate of 500/second or more. The high-shear viscosity loss in metal-crosslinked polymer fluids that can occur during transit down the wellbore to the formation is generally irreversible and cannot be recovered. We use the term "persistent gels" herein to refer to such irreversibly crosslinked aqueous polymers.

High shear sensitivity of the metal crosslinked fluids can sometimes be addressed by delaying the crosslinking of the fluid so that it is retarded during the high-shear conditions and onset does not occur until the fluid has exited the tubulars. Because the treatment fluid is initially cooler than the formation and is usually heated to the formation temperature only after exiting the tubulars, some delaying agents work by increasing the temperature at which gelation takes place. Bicarbonate and lactate are examples of delaying agents that are known to increase the gelling temperatures of the metal crosslinked polymer fluids. Although these common delaying agents make fluids less sensitive to high shear treatments, they may at the same time result in a decrease in the ultimate fluid viscosity. Also, the common delaying agents may not adequately increase the gelation temperature for the desired delay, especially where the surface fluid mixing temperature is relatively high or the fluid is heated too rapidly during injection.

In contrast, a boron-crosslinked polymer solution is substantially tolerant to high shear rates, such as those experienced in the wellbore tubulars, without damaging the performance of the gel. Although there is a loss of viscosity in borate-crosslinked systems during high shear, that viscosity is regained rapidly after the substantial reduction or cessation of shearing and the borate crosslinks are re-formed.

In some treatment systems, borate crosslinkers have been used in conjunction with metal crosslinkers, e.g. U.S. Pat. No. 4,780,223. In theory, the borate crosslinker can gel the polymer fluid at a low temperature through a reversible crosslinking mechanism that can be broken by exposure to high shear, but can repair or heal after the high shear condition is removed. The shear-healing borate crosslinker can thus be used to thicken the fluid during high shear such as injection through the wellbore while the irreversible metal crosslinking is delayed until the high shear condition is passed, i.e. usually after entry into the formation or fracture. A high pH, e.g. 9 to 12 or more, is usually used to effect borate crosslinking and in some instances as a means to control the borate crosslinking. For example, the pH and/or the borate concentration may be adjusted on the fly in response to pressure friction readings during the injection so that the borate crosslinking occurs near the exit from the tubulars in the wellbore. The metal crosslinker must of course be suitable for use at these pH conditions and must not excessively interfere with the borate crosslinking.

For polymers that are ionically modified for improved hydration and ultimate gel properties, crosslinking can sometimes be difficult, especially with crosslinkers such as borates that do not form strong bonds to the polymer crosslinking sites. Some anionically and/or cationically modified polymers tend to expand or uncoil in aqueous media due to the repulsion of like charged moieties on the polymer backbone, reducing overlapping to the extent borate crosslinking does not occur. The rheology profile of carboxymethylhydroxypropyl guar (CMHPG) in the presence of borate crosslinker is shown in FIG. 1. However, the presence of 2 wt % KCl in the otherwise identical CMHPG-borate solution can effectively screen the anionic charges with electric bi-layers to decrease the charge intensity, and in turn decrease the repulsions between charged polymer chains. Charge screening in this manner can collapse the polymer chains and achieve overlapping for borate crosslinking to occur as also shown in the rheology profile in FIG. 1.

Standard 2 wt % KCl brines are also sometimes conveniently used as a clay stabilizer when drilling or treating certain formations wherein clay is prone to swell from aqueous exposure. Unfortunately, while the use of KCl or other high ionic strength brines can obtain both clay stabilization and effective borate crosslinking of CMHPG, the final gel strength and thermal persistence of the metal-crosslinked gels can be adversely affected by the high ionic strength.

On the other hand, tetramethyl ammonium chloride (TMAC) is also a common clay stabilizer, particularly when it is desired to use a low ionic strength treatment fluid without impacting ultimate gel strength and/or thermal persistence at higher formation temperatures; however, the use of TMAC in place of KCl is ineffective to charge screen CMHPG in that borate crosslinking does not occur when TMAC is used in a low conductivity fluid medium. As used herein, a low conductivity medium is one having a conductivity which measures less than 10 mS/cm, preferably less than 5 mS/cm and especially about 2 mS/cm or less, or having a KCl concentration less than 0.5 wt % by weight of the liquid phase.

It has been proposed to hydrophobically modify ionic polymers using an oppositely charged surfactant having a relatively long hydrophobic group, where the surfactant forms an ion-pair association with the polymer resulting in a hydrophobically modified polymer having a plurality of hydrophobic groups, as described in published application US 20040209780. The hydrophobic groups in adjacent hydrophobically modified polymers are said to form micellar associations by the further addition of surfactant, thereby forming crosslinks through the micellar associations and increasing the viscosity of the fluid system. However, applicant's investigation, as reflected in FIG. 4 below, suggests that longer hydrophobic groups and/or higher surfactant concentrations are needed for successful micellar association crosslinking.

What is needed in the art is a system and well treatment method in which an anionically or cationically charged polymer with a clay stabilizer can be crosslinked in a low-conductivity fluid medium, by borate and/or metal crosslinkers, without significantly adversely impacting final gel strength and/or thermal persistence of the crosslinked gels.

SUMMARY OF THE INVENTION

For early crosslinking of an ionic polymer in a low conductivity aqueous medium with a boron source followed by crosslinking at a higher temperature by a metal crosslinker, it has been found that surfactants with oppositely charged moieties can provide an adequate response to both borate and metal crosslinkers.

In one embodiment a method of treating a subterranean formation penetrated by a well bore is presented. The method can comprise the steps of: (a) mixing into an aqueous medium a polymer comprising pendant ionic moieties, a surfactant comprising oppositely charged moieties, and a borate source, in amounts effective for gel formation, wherein the resulting aqueous mixture has a conductivity less than 10 mS/cm or a KCl concentration less than 0.5 weight percent by weight of the liquid phase; (b) injecting the aqueous mixture into the well bore; and (c) gelling the aqueous mixture.

Embodiments generally may be based upon aqueous or nonaqueous fluid bases.

In an embodiment, the polymer comprises anionically modified polysaccharide, such as, for example, carboxylated polysaccharide like carboxymethyl guar (CMG) or carboxymethylhydroxypropyl guar (CMHPG), and the surfactant comprises cationic moieties. Additional examples of suitable polymers are described below.

In embodiments, the surfactant can be a cationic surfactant, or a zwitterionic or amphoteric surfactant, wherein the polymer is anionic. In another embodiment, the surfactant comprises an amine functional surfactant, for example, a quaternary ammonium group surfactant, wherein the polymer is anionic.

In an embodiment, the polymer comprises cationically modified polysaccharide, such as, for example, cationically modified polysaccharide having a degree of substitution greater than 0.16, and the surfactant comprises anionic moieties. Additional examples of suitable polymers are described below. In embodiments, the surfactant can be an anionic surfactant, or a zwitterionic or amphoteric surfactant, wherein the polymer is cationic.

In an additional embodiment, the surfactant comprises a hydrophobic group of from 6 to 32 carbon atoms, or from 6 to 12 carbon atoms. Additional examples of surfactants are described below.

In an embodiment, the aqueous mixture further comprises a clay stabilizer. In other embodiments, the aqueous mixture further comprises an acid addition salt of a tetraalkyl ammonium of from 4 to 8 carbon atoms, such as, for example, tetramethyl ammonium chloride (TMAC) in an amount effective for clay stabilization. Additional examples of clay stabilizer are described below.

In an embodiment, the aqueous mixture further comprises a metal crosslinker, such as, for example, a complex of a Group 4 metal and a ligand selected from the group consisting of amino and phosphonic carboxylic acids and salts and derivatives thereof. In another embodiment, the aqueous mixture can comprise a complex of a Group 4 metal and a ligand selected from the group consisting of aspartic acid, glutamic acid, arginine, beta-alanine, alanine, phosphonoacetic acid, and salts and derivatives thereof. In an embodiment, a molar ratio of metal to ligand can be from 1:1 to 1:6.

Another embodiment provides a method of treating a subterranean formation penetrated by a well bore comprising: (a) mixing into an aqueous medium a polymer comprising pendant anionic moieties, a surfactant comprising cationic moieties, a clay stabilizer, a borate source, and a metal crosslinker, in amounts effective for gel formation, wherein the resulting aqueous mixture has a pH from 8.5 to 12.5, and wherein the aqueous mixture has a conductivity less than 10 mS/cm or a KCl concentration less than 0.5 percent by weight of the liquid phase; (b) injecting the aqueous mixture into the well bore; c) initiating a first gelling of the aqueous mixture with reversible crosslinking at a high shear condition, preferably near exit from the wellbore into the formation; and (d) thereafter initiating a second gelling of the aqueous mixture with persistent crosslinking for low shear conditions, preferably after entry into the subterranean formation. In embodiments, the polymer comprises carboxymethylhydroxypropyl guar; the surfactant comprises a quaternary ammonium group surfactant with a hydrophobic group of from 6 to 18 carbon atoms; the clay stabilizer comprises tetramethyl ammonium chloride; and the metal crosslinker comprises a complex of a Group 4 metal and a ligand selected from the group consisting of amino and phosphonic carboxylic acids and salts and derivatives thereof.

Another embodiment provides a method of treating a subterranean formation penetrated by a well bore comprising: (a) mixing into an aqueous medium a polymer comprising pendant cationic moieties and a degree of substitution greater than 0.16, a surfactant comprising anionic moieties, a clay stabilizer, a borate source, and a metal crosslinker, in amounts effective for gel formation, wherein the resulting aqueous mixture has a pH from 8.5 to 12.5, and wherein the aqueous mixture has a conductivity less than 10 mS/cm or a KCl concentration less than 0.5 percent by weight of the liquid phase; (b) injecting the aqueous mixture into the well bore; (c) initiating a first gelling of the aqueous mixture with reversible crosslinking at a high shear condition, preferably near exit from the wellbore into the formation; and (d) thereafter initiating a second gelling of the aqueous mixture with persistent crosslinking for low shear conditions, preferably after entry into the subterranean formation. In embodiments, the polymer comprises cationic guar; the surfactant comprises a sulfate group surfactant with a hydrophobic group of from 6 to 18 carbon atoms; the clay stabilizer comprises tetramethyl ammonium chloride; and the metal crosslinker comprises a complex of a Group 4 metal and a ligand selected from the group consisting of amino and phosphonic carboxylic acids and salts and derivatives thereof.

One embodiment is directed to an aqueous well treatment fluid comprising a polymer comprising pendant ionic moieties selected from the group consisting of cationic polymers having a degree of substitution of greater than 0.16 and anionic polymers, a surfactant comprising oppositely charged ionic moieties, a clay stabilizer, a borate source, and a metal crosslinker, in an aqueous mixture having a pH from 8.5 to 12.5, and a conductivity less than 10 mS/cm or a KCl content less than 0.5 percent by weight of the liquid phase, and in amounts effective to form a gel having a rheology profile comprising: (a) reversible shear viscosity recovery at a first condition comprising a temperature below 40° C.; and (b) a shear-sensitive persistent viscosity at a second condition comprising an elevated temperature with respect to the first condition and a pH sensitivity slope of 30° C. per pH unit or less.

DETAILED DESCRIPTION

Figure 1:
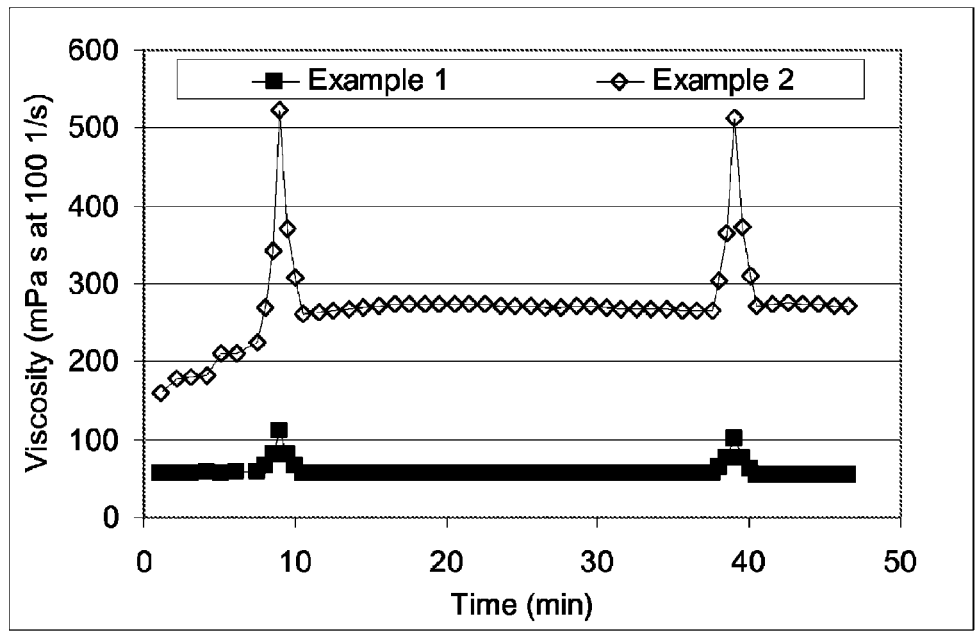
FIG. 1 shows the rheology profiles of a CMHPG fluid, with and without 2 wt % KCl as a charge screen, in response to the addition of a borate crosslinker as described in Examples 1 and 2.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The methods disclosed may be used for treating a wellbore and/or a subterranean formation where a viscosified treatment fluid is required. In a representative embodiment referred to herein for purposes of illustration and not by way of limitation, the method is used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications," Encyclopedia of Polymer Science and Engineering, vol. 10, pp. 328-366 (John Wiley & Sons, Inc. New York, N.Y., 1987) and references cited therein.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids are used in the pad treatment, the proppant stage, or both.

Some embodiments are directed to methods of treating subterranean formations using an aqueous mixture of an ionically charged polymer, and an oppositely charged ionic surfactant, that is crosslinked with a borate source. As used herein, an aqueous mixture refers to mixtures having a continuous liquid phase that is aqueous, i.e. contains water and other components soluble or miscible in the water-containing phase, and also includes slurries, emulsions, foams, etc. having a continuous aqueous phase. As used herein, an oppositely charged ionic surfactant refers to surfactants that possess at least one ionic charge in the amphiphilic chain of opposed sign to that present in the polymer. This opposite charge is to be distinguished from the ionic charge on any counterions, which possess an ionic charge of the same sign as that present in the polymer. The hydratable polymer is generally stable in the presence of dissolved salts. Accordingly, ordinary tap water, produced water, brines, and the like can be used to prepare the polymer solution used in an embodiment of the aqueous mixture.

In embodiments where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons, i.e. where the reservoir drilling fluid used a particular brine phase and the completion/clean up fluid brine phase is chosen to have the same brine phase.

In another embodiment, the aqueous medium has a low brine or salt concentration to provide a low conductivity mixture. In one embodiment the mixture is free of added salt. In other embodiments, the aqueous medium has a low conductivity such as less than 10 mS/cm, less than 5 mS/cm, or less than 2 mS/cm. Low conductivity can facilitate higher gel strengths and/or thermal persistence of metal crosslinked gels. Conductivity is readily measured with a conductivity meter. Alternatively or additionally, especially where the aqueous mixture may have a high conductivity from ions other than KCl, the aqueous medium can contain less than 0.5 percent KCl by weight of the liquid phase, preferably less than 0.2 wt %, less than 0.1 wt % or less than 0.05 wt %, or can be free of added KCl, or can be essentially free of KCl in amounts to provide or contribute to clay stability.

The hydratable polymer in an embodiment is a high molecular weight water-soluble polysaccharide containing ammonium or carboxylate groups or other ionically charged moieties that facilitate hydration of the polymer and have the added advantage of improved viscosification with a metal crosslinker, including a higher ultimate gel strength and/or improved thermal persistence. The polymer can further contain cis-hydroxyl and/or ionic moieties that can react with borate for reversible crosslinking and/or form a complex with a metal.

Without limitation, useful polysaccharides have molecular weights in the range of about 200,000 to about 3,000,000. Galactomannans represent an embodiment of polysaccharides having adjacent cis-hydroxyl groups for the purposes described herein. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include tara, huisache, locust bean, palo verde, flame tree, guar bean plant, honey locust, lucerne, Kentucky coffee bean, Japanese pagoda tree, indigo, jenna, rattlehox, clover, fenugreek seeds, soy bean hulls and the like. The gum is provided in a convenient particulate form. Of these polysaccharides, anionic modified guar and its derivatives are preferred. As a galactomannan, guar gum is a branched copolymer containing a mannose backbone with galactose branches.

Anionically modified guar can include carboxymethyl guar, carboxymethylhydroxyethyl guar, carboxymethylhydroxypropyl guar (CMHPG), and combinations thereof. Cationically modified guar can include quaternary ammonium moieties, preferably with a degree of substitution greater than about 0.16, 0.20, 0.25, 0.3 or 0.5. The ionically modified guar gum can be used alone or with hydroxyethyl guar, hydroxypropyl guar (HPG), guar hydroxyalkyltriammonium chloride, and the like, in minor amounts that do not adversely impact the properties of the gel. Heteropolysaccharides, such as diutan, xanthan, and scleroglucan, and ionically modified derivatives thereof may be present. Synthetic polymers such as, but not limited to, polyacrylamide and polyacrylate polymers and copolymers are used typically for high-temperature applications.

The hydratable polymer may be present at any suitable concentration. In various embodiments hereof, the hydratable polymer can be present in an amount of from about 1.2 to less than about 7.2 g/L (10 to 60 pounds per thousand gallons or ppt) of liquid phase, or from about 1.8 g/L (15 ppt) to less than about 4.8 g/L (40 ppt), from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the hydratable polymer can be present in an amount of from about 1.2 g/L (10 ppt) to less than about 6 g/L (50 ppt) of liquid phase, with a lower limit of polymer being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the polymers can be present in an amount of about 2.4 g/L (20 ppt).

Fluids incorporating a hydratable polymer (linear gel) may have any suitable viscosity, for instance, a viscosity value of about 50 mPa-s or greater at a shear rate of about 100 s$^{-1}$ at treatment temperature, or about 75 mPa-s or greater at a shear rate of about 100 s$^{-1}$, or even about 100 mPa-s or greater, in some instances. At the concentrations mentioned, the hydration rate is independent of modified guar concentration. Use of lower levels tends to lead to development of insufficient viscosity, while higher concentrations tend to waste material. Where those disadvantages are avoided, higher and lower concentrations are useful.

The term "reversible gel" is used herein in reference to polymers that are crosslinked with borate or similar crosslinkers that form labile crosslinking bonds with the polymer wherein high shear conditions can preferentially break the crosslinking bonds and wherein the crosslinking bonds can re-establish upon return to low shear conditions. Reversible gels have the characteristic rheology profile known as shear healing. Reversible gels, because of the relatively weak crosslinking bonds, also frequently are thermally unstable and can lose viscosity at higher temperatures. The term "persistent gel" is used herein in reference to polymers that are crosslinked via a generally irreversible crosslinking mechanism such as, for example, metal crosslinking. Persistent gels are sensitive to high shear and can lose viscosity or "break" when high shear (or a chemical and/or thermal reaction) breaks the polymer backbone which is irreversibly bound to the metal crosslinkers.

When a polymer is referred to as comprising a monomer or comonomer, the monomer is present in the polymer in the polymerized form of the monomer or in the derivative from the monomer. However, for ease of reference the phrase comprising the (respective) monomer or the like may be used as shorthand.

When crosslinkers are used in wellbore treatment fluids for subterranean applications, in one embodiment, a water soluble polymer is placed into and hydrated, usually at a neutral or slightly acidic pH, in a mixer with water, which can contain other ingredients such as the surfactant and/or the clay stabilizer, as well as other salts, buffers, and temperature stabilizers. A concentrated source of borate, either in solution or as a slurry, is sometimes added to the hydration mixer, but is more commonly added after the polymer is fully hydrated and/or the pH is increased for suitable borate crosslinking. If used, a concentrated metal crosslinker solution, comprising from 1000 ppm of the metal-ligand complex up to saturation, is added prior to the fluid mixture being pumped into the well to provide the desired concentration of the metal in the injected fluid mixture. Applications such as hydraulic fracturing, gravel packing and conformance control use such crosslinked fluid systems. The liquid metal crosslinker additive concentrations typically range from about 0.01 volume percent to 1.0 percent by volume, based upon total volume of the liquid phase.

In some embodiments, ionic polymers (such as CMHPG) in an aqueous solution can be present in solvated coils that have a larger radius of gyration than the corresponding non-ionic parent polymer due to electric repulsions between like charges from the ionic substituents. This may cause the polymer to spread out without sufficient overlapping of the functional groups from different polymer chains for a crosslinker to react with more than one functional group (no crosslinking), or alternatively, it may cause the orientation of functional groups to exist in an orientation that is difficult for the crosslinker to reach. For example, in deionized water, guar polymer can be crosslinked easily by boron crosslinker while CMHPG, and cationic guar with a high degree of substitution, e.g. greater than about 0.16 for some cationic guars, can not. Screening the charges of the ionic species can reduce or eliminate the electric repulsion and thus collapse the polymer coil to create some overlapping, which in turn can allow the crosslinker to crosslink the ionic polymers.

Different compounds can be used to screen the charges of an ionic polymer (for example CMHPG), namely KCl (or other salt to increase ionic strength) to screen, or ionic surfactants to screen, such as quaternary ammonium salt for CMHPG. Salts can be selected from a group of different common salts including organic or inorganic such as KCl, NaCl, NaBr, $CaCl_2$, $R_4N^+Cl^-$ (e.g. TMAC), NaOAc etc. Surfactants can be fatty acid quaternary amine chloride (bromide, iodide), with at least one alkyl group being long chain fatty acid or alpha olefin derivatives, other substituents can be methyl, ethyl, iso-propyl type of alkyls, ethoxylated alkyl, aromatic alkyls etc. Some methods may also use cationic polymers to charge screen or help charge screen the anionic polymers.

Although not limited to any particular theory of operation or mechanism, it is conceptualized that fluid performance may be further optimized when polymer coils in solution and have enough overlapping so that crosslinking occurs both intra- and inter-molecularly. Viscoelasticity improvements may come from inter-molecular crosslink, and intra-molecular crosslink can not be effectively avoided. For example, adding KCl and/or cationic surfactant to an anionic polymer solution such as CMHPG can effectively screen the anionic charges with electric bi-layers to decrease the charge intensity, and in turn decrease the repulsions between charged polymer chains. Charge screening in this manner can collapse the polymer chains and achieve overlapping for crosslinking to occur.

In one embodiment, charge screening surfactants are employed. In some embodiments, where the polymer has anionic moieties, the surfactant is a cationic surfactant. Examples of suitable ionic surfactants also include, but are not limited to, cationic surfactants such as alkyl amine derivatives, alkyl diamines derivatives, alkyl ether amines derivatives, alkyl quaternary ammonium, dialkyl quaternary ammonium and ester quaternary ammonium compounds. Cationic surfactants typically have a positively charged moiety and a hydrophobic or aliphatic tail, and can be used to charge screen anionic polymers such as CMHPG.

Examples of suitable anionic surfactants, where the polymer is cationic guar or the like, include, but are not limited to, alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Anionic surfactants typically have a negatively charged moiety and a hydrophobic or aliphatic tail, and can be used to charge screen cationic polymers such as cationic guar. One particularly useful anionic surfactant is sodium tridecyl ether sulfate.

In general, the longer the tail group in the surfactant, the more effective is the boron crosslinking. However, the metal crosslinker decreases in effectiveness as the surfactant tail gets longer. In the case of cationic surfactants, benzyldimethylcocoalkyl ammonium chloride (DMCB) is an example of a charge screening surfactant for CMHPG that is balanced for boron and metal crosslinking.

Some fluids according to some embodiments may also include a surfactant. In one embodiment, for example, the aqueous mixture comprises both a stabilizer such as KCl or especially TMAC, as well as a charge screening surfactant. This system can be particularly effective in ligand-metal crosslinker methods that also employ borate as a low temperature co-crosslinker. Alternatively or additionally, any surfactant which aids the dispersion and/or stabilization of a gas component in the base fluid to form an energized fluid can be used. Viscoelastic surfactants, such as those described in U.S. Pat. No. 6,703,352, U.S. Pat. No. 6,239,183, U.S. Pat. No. 6,506,710, U.S. Pat. No. 7,303,018 and U.S. Pat. No. 6,482,866, all incorporated herein by reference, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944® (available from Baker Petrolite of Sugar Land, Tex.). Examples of some other suitable surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates.

Any effective amount of surfactant or blend of surfactants may be used to form aqueous energized fluids. Preferably the fluids incorporate the surfactant or blend of surfactants in an amount of about 0.02 weight percent to about 5 weight percent of total liquid phase weight, and more preferably from about 0.05 weight percent to about 2 weight percent of total liquid phase weight.

A borate source can be used as a crosslinker in one embodiment in the surfactant-charge screened, anionic-polymer fluids, especially where low temperature, reversible crosslinking is used in the method for generally continuous viscosification before the polymer is crosslinked with the metal, or simultaneously. The aqueous mixture can thus include a borate source, which can either be included as a soluble borate or borate precursor such as boric acid, or it can be provided as a slurry of borate source solids for delayed borate crosslinking until the fluid is near exit from the tubular into the downhole formation. By definition, "slurry" is a mixture of suspended solids and liquids. The slurry that is used in some methods can be prepared at or near the site of the well bore or can be prepared a remote location and shipped to the site of its intended use. Methods of preparing slurries are known in the art. It is preferred that the slurry be prepared offsite, since this can reduce the expense associated with the transport of equipment, materials and expertise necessary to the preparation of a slurry on site.

The term "mesh" as used in the present application means the Tyler mesh size. The Tyler mesh size is a scale of particle size in powders. The particle size can be categorized by sieving or screening, that is, by running the sample through a specific sized screen. The particles can be separated into two or more size fractions by stacking the screens, thereby determining the particle size distribution.

Solid borate crosslinking agents suitable in certain embodiments are water-reactive and insoluble in a non-aqueous slurry, but become soluble when the slurry is mixed with the aqueous medium. In certain embodiments, the solids will include a slowly soluble boron-containing mineral. These may include borates, such as anhydrous borax and borate hydrate, e.g. sodium tetraborate.

The term "non-aqueous" as used in the present application in one sense refers to a composition to which no water has been added as such, and in another sense refers to a composition the liquid phase of which comprises no more than 1, 0.5, 0.1 or 0.01 weight percent water based on the weight of the liquid phase. The liquid phase of the borate slurry in embodiments can be a hydrocarbon or oil such as naphtha, kerosene or diesel, or a non-oily liquid. In the case of hydrophobic liquids such as hydrocarbons, the solubilization of the borate solids is delayed because the water must penetrate the hydrophobic coating on the solids.

In one embodiment, the liquid phase of the borate slurry can include a hygroscopic liquid which is generally non-aqueous and non-oily. The liquid can have strong affinity for water to keep the water away from any crosslinking agent, which would otherwise reduce the desired delay of crosslinking, i.e. accelerate the gelation. Glycols, including glycol-ethers, and especially including glycol-partial-ethers, represent one class of hygroscopic liquids. Specific representative examples of ethylene and propylene glycols include ethylene glycol, diethylene glycol, triethylene glycol, propylene glycol, dipropylene glycol, tripropylene glycol, $C_1$ to $C_8$ monoalkyl ethers thereof, and the like. Additional examples include 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, $C_1$ to $C_8$ monoalkyl ethers thereof, and the like.

In one embodiment, the hygroscopic liquid can include glycol ethers with the molecular formula R—OCH$_2$CHR$^1$OH, where R is substituted or unsubstituted hydrocarbyl of about 1 to 8 carbon atoms and $R^1$ is hydrogen or alkyl of about 1 to 3 carbon atoms. Specific representative examples include solvents based on alkyl ethers of ethylene and propylene glycol, commercially available under the trade designation CELLOSOLVE, DOWANOL, and the like. Note that it is conventional in the industry to refer to and use such alkoxyethanols as solvents, but the slurried borate solids should not be soluble in the liquid(s) used in the borate slurry.

The liquid phase of the borate slurry can have a low viscosity that facilitates mixing and pumping, e.g. less than 50 cP (50 mPa-s), less than 35 cP (35 mPa-s), or less than 10 cP (10 mPa-s) in different embodiments. The slurry liquid can in one embodiment contain a sufficient proportion of the glycol to maintain hygroscopic characteristics depending on the humidity and temperature of the ambient air to which it may be exposed, i.e. the hygroscopic liquid can contain glycol in a proportion at or preferably exceeding the relative humectant value thereof. As used herein, the relative humectant value is the equilibrium concentration in percent by weight of the glycol in aqueous solution in contact with air at ambient temperature and humidity, e.g. 97.2 weight percent propylene glycol for air at 48.9° C. (120° F.) and 10% relative humidity, or 40 weight percent propylene glycol for air at 4.4° C. (40° F.) and 90% relative humidity. In other embodiments, the hygroscopic liquid can comprise at least 50 percent by weight in the slurry liquid phase (excluding any insoluble or suspended solids) of the glycol, at least 80 percent by weight, at least 90 percent by weight, at least 95 percent by weight, or at least 98 percent by weight.

If desired, in one embodiment, the borate slurry can also include a suspension aid to help distance the suspended solids from each other, thereby inhibiting the solids from clumping and falling out of the suspension. The suspension aid can include silica, organophilic clay, polymeric suspending agents, other thixotropic agents or a combination thereof. In certain embodiments the suspension aid can include polyacrylic acid, an ether cellulosic derivative, polyvinyl alcohol, carboxymethylmethylcellulose, polyvinyl acetate, thiourea crystals or a combination thereof. As a crosslinked acrylic acid based polymer that can be used as a suspension aid, there may be mentioned the liquid or powdered polymers available commercially under the trade designation CARBOPOL. As an ether cellulosic derivative, there may be mentioned hydroxypropyl cellulose. Suitable organophilic clays include kaolinite, halloysite, vermiculite, chlorite, attapullgite, smectite, montmorillonite, bentonite, hectorite or a combination thereof.

In various embodiments, the borate solution or slurry component can include crosslinking delay agents such as a polyol compound, including sorbitol, mannitol, sodium gluconate and combinations thereof. The crosslink delay agent can provide performance improvement in the system through increased crosslink delay, enhanced gel strength when the polymer is less than fully hydrated and enhanced rate of shear recovery. It is preferred that the polyol be present in an amount effective for improved shear recovery. Further, the polyol can be present in an amount that is not effective as a breaker or breaker aid.

In one embodiment, the aqueous mixture comprises a metal crosslinker. Metal crosslinkers such as complexes or solutions of Zr, Ti, Cr, Al, Sb, V, Cu, Fe, Ni may be used with or without a borate crosslinker. In one embodiment, certain nitrogen- and/or phosphorus-containing carboxylic acids and derivatives can form complexes with the metals commonly used as crosslinkers in the oilfield. The metal in various embodiments can be a Group 4 metal, such as Zr and Ti. Zirconium (IV) was found to be the preferred metal to form complexes with various alpha or beta amino acids, phosphonic acids and derivatives thereof for the application in crosslinker formulations. These compounds are selected in one embodiment from various alpha or beta amino carboxylic acids, phosphono carboxylic acids, salts and derivatives thereof of the following general structures:

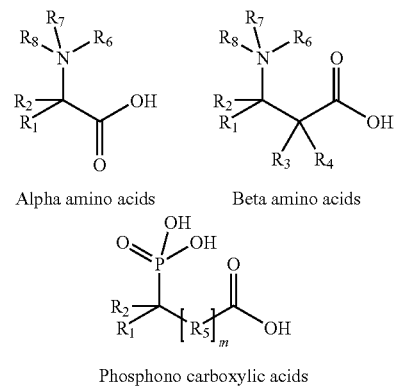

wherein in one embodiment, $R_1$, $R_2$, $R_3$, $R_4$, $R_7$ and $R_8$ can be any substituent such as hydrogen, hydrocarbyl or heterohydrocarbyl, preferably an aliphatic hydrocarbon structure or a heteroatom containing hydrocarbon structure; $R_6$ is hydrogen or a lone electron pair; and m is 0 or 1, and when m is 1, $R_5$ is hydrocarbylene or heterohydrocarbylene, preferably an aliphatic hydrocarbon structure or a heteroatom containing hydrocarbon structure. Also, any two of $R_1$, $R_2$, $R_3$, $R_4$, $R_7$ and $R_8$ in one of the compounds can together form a cyclic hydrocarbylene or heterohydrocabylene bridge, preferably an aliphatic hydrocarbon structure or a heteroatom containing hydrocarbon structure.

As used herein, a hydrocarbyl is a monovalent radical consisting of hydrogen and carbon atoms, e.g., branched, linear or cyclic aliphatic, saturated or unsaturated, or aromatic; and a heterohydrocarbyl is a monovalent radical consisting of atoms of hydrogen, carbon and one or more of oxygen, nitrogen, sulfur or the like. Hydrocarbylene and heterohydrocarbylene are the corresponding divalent radicals. As used herein, the term "aliphatic hydrocarbon structure" is any organic structure containing exclusively hydrogen and carbon atoms except those containing aromatic structures. Examples of aliphatic structures are methyl, isopropyl, isobutyl, and the like. Similarly, "heteroatom containing hydrocarbon structure" is any organic structure containing in addition to carbon and hydrogen at least another atom selected from oxygen, nitrogen, sulfur, except those containing aromatic structures. Examples of such structures are hydroxymethyl, hydroxyethyl, hydroxypropyl, carboxymethyl, aminobutyl, thiomethyl, and the like.

In various embodiments, each of the hydrocarbyl, heterohydrocarbyl, hydrocarbylene and/or heterohydrocarbylene radicals can comprise from 1 to 12 carbon atoms, from 1 to 8 carbon atoms, from 1 to 6 carbon atoms, from 1 to 4 carbon atoms, or from 1 to 3 carbon atoms. The compound can have a total of from 2 to 40 carbon atoms, from 3 to 40 carbon atoms, from 3 to 24 carbon atoms, from 3 to 18 carbon atoms, from 3 to 12 carbon atoms, or from 3 to 8 carbon atoms.

In one embodiment, at least one of $R_1$, $R_2$, $R_3$, $R_4$, $R_5$, $R_7$ and $R_8$ is a heterohydrocarbyl ($R_1$, $R_2$, $R_3$, $R_4$, $R_7$, $R_8$) or heterohydrocarbylene ($R_5$), substituted with one or more functional groups, preferably an electrophilic functional group that can attach the compound to the Group 4 metal together with the carboxylic acid and/or phosphonic acid group as a multidentate ligand, e.g. bidentate, tridentate etc. As used herein, when ligands are described as comprising neutral stable forms or ionic forms of the compounds, it is well understood by one skilled in the art, that the ionic form or other derivatized form of the component is the form that reacts with the metals to produce the complex wherein the ligand is present in the complexed derivative form.

In an embodiment, the functional group substituent(s) can be selected from carboxylic acids; carboxy salts; carboxy esters, amides and imides; hydroxy; alkoxide; phenoxide; thiolate; thioether; xanthate; cyanide; nitrile; amino and mixtures thereof. In another embodiment, the functional group substituent(s) can be selected from carboxylic acids; carboxy salts; carboxy esters; amides and imides; and mixtures thereof.

In one embodiment the compound is a primary alpha-amino acid of the above respective formula wherein $R_7$ and $R_8$ are hydrogen, as in many of the standard amino acids. In alternative or additional embodiments, $R_6$ is hydrogen (forming an ammonium ion) or a lone electron pair, and $R_1$, $R_2$, $R_7$ and $R_8$ are independently selected from hydrogen (e.g. glycine), alkyl (e.g. alanine, leucine, isoleucine, valine), phenylalkyl (e.g. phenyl-alanine), hydroxyalkyl (e.g. serine, threonine), hydroxyphenylalkyl (e.g. tyrosine), carboxyalkyl (e.g., aspartic acid, glutamic acid), carbamoylalkyl (e.g. asparagine, glutamine), carbamoylaminoalkyl (e.g. citrulline), aminoalkyl (e.g. lysine, ornithine), indolylalkyl (e.g. tryptophan), imidazolylalkyl (e.g. histidine), guanidinylalkyl or diaminomethylidene-aminoalkyl (arginine), sulfanylalkyl (e.g. cysteine, homocysteine), alkylsulfanylalkyl (e.g. methionine), and the like. Further, $R_1$ and $R_2$ together, $R_7$ and $R_8$ together, or one of $R_1$ and $R_2$ and one of $R_7$ and $R_8$ together, can form a hydrocarbylene or heterohydrocarbylene bridge or cyclic structure, such as for example, pyrrolidine in proline or hydroxypyrrolidine in hydroxyproline. Of these, a preferred embodiment is wherein one or more of $R_1$, $R_2$, $R_7$ and $R_8$ are carboxyalkyl, dicarboxyalkyl or tricarboxyalkyl of from 2 to 8, 2 to 6, or 2 to 4 carbon atoms. In a further embodiment, neither $R_7$ nor $R_8$ are hydroxyalkyl. Alternatively, none of $R_1$, $R_2$, $R_7$ and $R_8$ is hydroxyalkyl.

In one embodiment the compound is a beta-amino acid of the respective above formula wherein $R_1$, $R_2$, $R_3$, $R_4$, $R_7$ and $R_8$ are independently selected from hydrogen and hydrocarbyl optionally containing a heteroatom, or together can form a substituted or unsubstituted cycloaliphatic bridge optionally containing a heteroatom, and $R_6$ is hydrogen (forming an ammonium ion) or a lone electron pair. In one embodiment the compound is a primary beta-amino acid of the above formula wherein $R_7$ and $R_8$ are hydrogen. In an alternative or additional embodiment, $R_1$, $R_2$, $R_3$, $R_4$, $R_7$ and $R_8$ are independently selected from hydrogen, alkyl, phenylalkyl, hydroxyalkyl, hydroxyphenylalkyl, carboxyalkyl, carbamoylalkyl, carbamoylaminoalkyl, aminoalkyl, indolylalkyl, imidazolylalkyl, guanidinylalkyl or diaminomethylidene-aminoalkyl, sulfanylalkyl, alkylsulfanylalkyl, and the like. Further, $R_1$ and $R_2$ together, $R_3$ and $R_4$ together, $R_7$ and $R_8$ together, or one of $R_1$ and $R_2$ and one of $R_7$ and $R_8$ together, can form a hydrocarbylene or heterohydrocarbylene bridge or cyclic structure, such as for example, pyrrolidine or hydroxypyrrolidine. In a further embodiment, neither $R_7$ nor $R_8$ are hydroxyalkyl. Alternatively, none of $R_1$, $R_2$, $R_3$, $R_4$, $R_7$ and $R_8$ is hydroxyalkyl. In another embodiment, the compound is derived from beta-alanine.

In an additional embodiment, the compound is a phosphonic acid according to the respective formula above wherein $R_1$ and $R_2$ are independently selected from hydrogen and hydrocarbyl optionally containing a heteroatom, or together can form a substituted or unsubstituted cycloaliphatic bridge optionally containing a heteroatom; m is 0 or 1, and when m is 1, $R_5$ is hydrocarbylene or heterohydrocarbylene. In an alternative or additional embodiment, $R_1$ and $R_2$ are independently selected from hydrogen, alkyl, phenyl, phenylalkyl, hydroxy, hydroxyalkyl, hydroxyphenylalkyl, carboxy, carboxyalkyl, carbamoyl, carbamoylalkyl, carbamoylaminoalkyl, amino, aminoalkyl, indolyl, indolylalkyl, imidazolyl, imidazolylalkyl, guanidinyl, guanidinylalkyl or diaminomethylidene-aminoalkyl, sulfanyl, sulfanylalkyl, alkylsulfanylalkyl, and the like. In one embodiment, the compound is phosphonoacetic acid.

The molar ratio of metal to ligand in the complex can range from 1:1 to 1:10. Preferably the ratio of metal to ligand can range from 1:1 to 1:6. More preferably the ratio of metal to ligand can range from 1:1 to 1:4. Those complexes, including mixtures thereof, can be used to crosslink the hydratable polymers. For a given polymer the crosslinking by metal-amino acid or metal-phosphonic acid complex occurs at substantially higher temperatures than by metal complexes formed only with ligands such as alkanolamines, like triethanolamine, or alpha hydroxy carboxylates, like lactate, that have been used as delay agents.

The following acids and their corresponding addition salts are representative examples of ligands that can be used for high-temperature crosslinker formulations: alanine, arginine, asparagine, aspartic acid, cysteine, glutamic acid, glutamine, glycine, histidine, isoleucine, leucine, lysine, methionine, phenylalanine, proline, tryptophan, tyrosine, valine, carnitine, ornithine, taurine, citrulline, glutathione, hydroxyproline, and the like. The following acids and their salts were found to be more preferred ligands for high-temperature crosslinker formulations: D,L-glutamic acid, L-glutamic acid, D-glutamic acid, D,L-aspartic acid, D-aspartic acid, L-aspartic acid, beta-alanine, D,L-alanine, D-alanine, L-alanine, and phosphonoacetic acid.

In an embodiment, the ligand system is selected to provide a pH sensitivity slope (pHSS) less than 30° C., preferably from 2° to 25° C., and/or a crosslinking onset temperature above 40° C., preferably between 40° C. and 60° C. As used herein, "pH sensitivity slope" has units ° C. per unit pH and refers to the change in crosslinking temperature in relation to the change in pH for a system of polymer and metal-ligand crosslinker, and is calculated according to the formula: $pHSS=|(T_{XL1}-T_{XL2})/(pH_2-pH_1)|$ where $pH_1$ and $pH_2$ are lower and higher pH values, respectively, at 25° C. within the pH range 8.5-12.5, preferably 9-12, preferably 9.5-11.5, more preferably 10 to 11, and especially 10-10.5, for the system being evaluated prior to heating, without borate or other low temperature crosslinker, to determine the corresponding crosslinking temperatures, $T_{XL1}$ and $T_{XL2}$, according to the microwave crosslinking temperature test described herein. In general, the crosslinking temperature increases as the pH decreases, but this is not a requirement and the absolute value of the pHSS is taken where pHSS is not zero and the crosslinking temperature decreases as the pH increases. Preferably, the pHSS is determined where the average of $pH_1$ and $pH_2$ at which the crosslinking temperatures are determined is between 10 and 11, and wherein $0.5 \leq (pH_2-pH_1) \leq 1.0$. Preferably, the pH sensitivity slope is 30° C. per pH unit or less for one unit pH within the pH range from 9.5 to 11.5, i.e. there exists a pH range of 1 unit (e.g. from 10.0 to 11.0) where the crosslinking temperature does not vary by more than 30° C. per pH unit. For the metal-ligand crosslinker systems the persistent gel crosslinking temperature in one embodiment is at least 40° C., and preferably less than 60° C. in another embodiment.

A buffering agent may be employed to buffer the treatment fluid, i.e., moderate amounts of either a strong base or acid may be added without causing any large change in pH value of the fracturing fluid. In various embodiments, the buffering agent is a combination of: a weak acid and a salt of the weak acid; an acid salt with a normal salt; or two acid salts. Examples of suitable buffering agents are: $NaH_2PO_4$—$Na_2HPO_4$; sodium carbonate-sodium bicarbonate; sodium bicarbonate; and the like. By employing a buffering agent in addition to a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

Non-limiting examples of hydroxyl ion releasing agent include any soluble or partially soluble hydroxide or carbonate that provides the desirable pH value in the fracturing fluid to promote borate ion formation and crosslinking with the polysaccharide and polyol. The alkali metal hydroxides, e.g., sodium hydroxide, and carbonates are preferred. Other acceptable materials are calcium hydroxide, magnesium hydroxide, bismuth hydroxide, lead hydroxide, nickel hydroxide, barium hydroxide, strontium hydroxide, and the like. At temperatures above about 79° C. (175° F.), potassium fluoride (KF) can be used to prevent the precipitation of MgO when magnesium hydroxide is used as a hydroxyl ion releasing agent. The amount of the hydroxyl ion releasing agent used in an embodiment is sufficient to yield a pH value in the fracturing fluid of at least about 8.0, preferably at least 8.5, preferably at least about 9.5, and more preferably between about 9.5 and about 12.

Aqueous fluid embodiments may also comprise an organoamino compound. Examples of suitable organoamino compounds include, but are not necessarily limited to, tetraethylenepentamine (TEPA), triethylenetetramine, pentaethylenhexamine, triethanolamine (TEA), and the like, or any mixtures thereof. A particularly useful organoamino compound is TEPA. Organoamines may be used to adjust (increase) pH, for example. When organoamino compounds are used in fluids, they are incorporated at an amount from about 0.01 weight percent to about 2.0 weight percent based on total liquid phase weight. Preferably, when used, the organoamino compound is incorporated at an amount from about 0.05 weight percent to about 1.0 weight percent based on total liquid phase weight.

Friction reducers may also be incorporated in any embodiments. Any friction reducer polymer such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the need for conventional fluid loss additives. Latex resins or polymer emulsions may be incorporated as fluid loss additives. Shear recovery agents may also be used in many embodiments.

Fluids may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation by borate ion is reversible.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the fluid can be any concentration known in the art, and will preferably be in the range of from about 0.03 to about 3 kilograms of proppant added per liter of liquid phase. Also, any of the proppant particles can further be coated with a resin to potentially improve the strength, clustering ability, and flow back properties of the proppant.

A fiber component may be included in the fluids to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Fluid embodiments may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium and other metal complexes. Examples of organic molecules referred as "alcohol stabilizers" include but are not limited to methanol, ethanol, n-propanol, isopropanol, n-butanol, tert-butanol, ethyleneglycol monomethyl ether, and the like.

In some of the following examples, a microwave crosslinking temperature test was used to determine crosslinking onset temperatures. In this procedure, 250 ml of sample solution were placed in a 400 ml glass beaker, heated in a 700 watt microwave for 10 seconds, removed from the microwave and stirred with a digital thermometer. If the stirring did not indicate a viscosity build-up adequate to show a first lip, the solution was returned to the microwave and heated for another 5 seconds and removed for another stir test. The heating was repeated until the stirring indicated a viscosity buildup, and then the beaker was tilted to determine if there was a first lip, i.e. the fluid was sufficiently elastic for a small, finger-sized lip to form and be retracted back into the beaker upon tilting in the opposite direction. The temperature recorded on the digital thermometer corresponding to the first lip can be taken as the crosslinking onset temperature.

The following examples are presented to illustrate the preparation and properties of the fluids and should not be construed to limit the scope of the invention, unless otherwise expressly indicated in the appended claims. All percentages, concentrations, ratios, parts, etc. are by weight unless otherwise noted or apparent from the context of their use.

Example 1 baselines for comparative purposes to show the charge screening effect of KCl and surfactants on a commercial carboxymethylhydroxypropyl guar (CMHPG) crosslinked with boron. For Example 1 (no KCl), a polymer solution was made by adding 1.8 g of a commercially-available CMHPG polymer powder used in the oilfield to 500 ml deionized water (30 pounds per thousand gallons (ppt)). This solution was stirred in a WARING blender for 30 minutes after reducing the pH to about 6.5 with fumaric acid. To this hydrated polymer solution, 0.75 ml of tetraethylenepentamine (TEPA) was added, raising the pH to 10.4, a value where boron crosslinking is quite active. To this solution, 2.5 ml of a 5% borax (sodium tetraborate decahydrate) solution (with 30 ppm of Boron) was added. The solution was then tested on a GRACE M5500 rheometer, and the viscosity was measured at 57 mPa s using an R1 rotor and B5 bob at 100 sec$^{-1}$ and 24° C. (75° F.). During the test on the rheometer at 7 and again at 37 minutes, the shear rate was adjusted from the 100 sec$^{-1}$ successively to 75, 50, 25, 50, 75 and then returned to 100 sec$^{-1}$. This changing of the shear rates is defined as a ramp and is described in the API Recommended Practices #39 and in ISO 13503-1. The viscosity at 100 sec$^{-1}$ remained relatively constant.

For Example 2, the combination of CMHPG and KCl in response to boron was investigated. The polymer solution was made as in Example 1, except that 10 g KCl were added to the deionized water prior to the addition of the CMHPG polymer. When the composition was tested on the rheometer under the same temperature and shear rate conditions, the viscosity measured was approximately 270 mPa s at 100 sec$^{-1}$. This result demonstrates the ability of KCl to improve the viscosity when boron is introduced into a CMHGP solution. The rheology profiles of the two systems are contrasted in FIG. 1.

For Example 3, the combination of CMHPG, boron, zirconium, cationic surfactant and tetra methyl ammonium chloride (TMAC) was studied. A 3.6 g/L (30 ppt) CMHPG fluid was prepared as in Example 1, except that 1 ml of a tetra methyl ammonium chloride (TMAC) clay stabilizer was added to the water prior to adding the polymer. After hydration, ALKAQUAT DMB-451 50% $C_{12}$-$C_{16}$ N-alkyl dimethyl benzyl ammonium surfactant (DMB) (0.085 vol %), Borax (2.5 ml of a 5 wt % aqueous solution, 30 ppm B) and 1.25 ml of a strongly-complexed zirconium crosslinker solution were added. The fluid viscosity was measured continuously at 100 sec$^{-1}$ on a computer-interfaced GRACE M3500 rheometer using rotor R1 and bob B1 geometry. The viscosity was contributed from a combination of the boron with the cationic surfactant. The viscosity of the Example 3 material is contrasted with that of Examples 1 and 2 in Table 1 below.

TABLE 1

Viscosity at 100 sec$^{-1}$ of 0.36 wt % CMHPG

| Examples | KCl (wt %) | DMB (vol %) | Boron (ppm) | Zr (ppm) | T (° C.) | Viscosity (mPa s) |
|---|---|---|---|---|---|---|
| 1 | 0 | 0 | 30 | 0 | 24 | 57 |
| 2 | 2.0 | 0 | 30 | 0 | 24 | 270 |
| 3 | 0 | 0.085 | 30 | 64 | 24 | 165 |

Example 4

DMCB Surfactant

Figure 2:
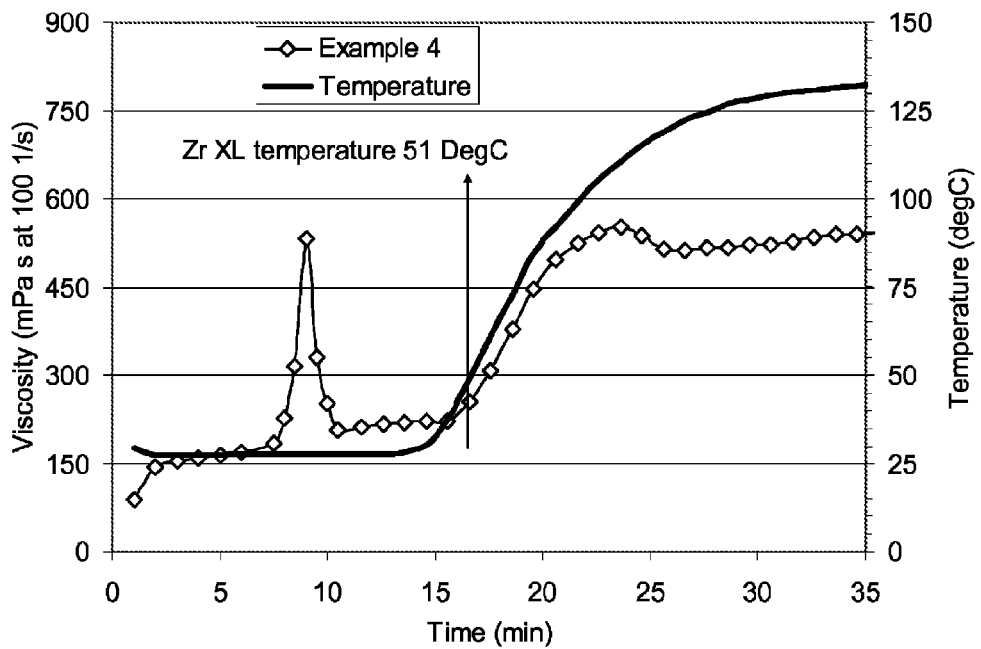
FIG. 2 shows the rheology profile of a CMHPG fluid treated with cationic surfactant, boron and zirconium crosslinker, as described in Example 4.

Example 3 was repeated except that 0.05 vol % DMCB surfactant (ARQUAD DMCB-80 benzyldimethylcocoalkyl ammonium chloride surfactant) was used in place of the DMB surfactant. At 24° C., the viscosity of the boron-surfactant crosslinked mixture was 160 mPa s; at 135° C. the zirconium crosslinking had increased the viscosity to 530 mPa s. The temperature at which the viscosity began to increase was taken as the Zr-complex crosslinking temperature (XLT), approximately 50° C., as seen in the rheology profile of FIG. 2.

Examples 5 and 6

Varying Amounts of DMCB

Figure 3:
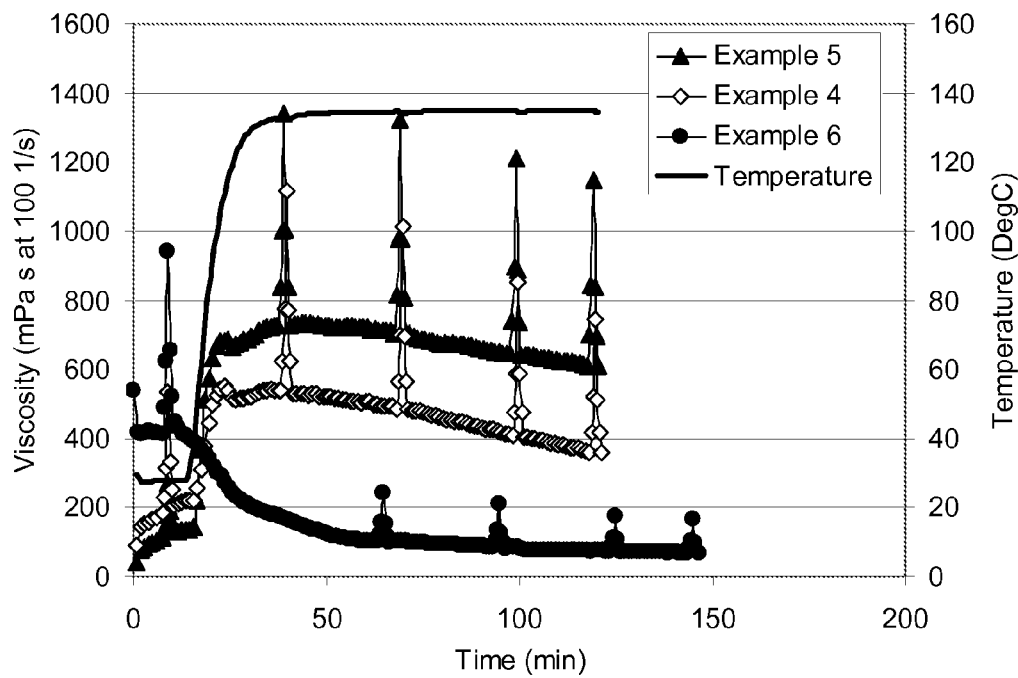
FIG. 3 shows the rheology profiles of a CMHPG fluid crosslinked with boron and zirconium complex at various ARQUAD DMCB-80 benzyldimethylcocoalkyl ammonium chloride surfactant (DMCB) concentrations as described in Examples 4, 5 and 6.

Example 4 was repeated at 0.025 vol % (Example 5) and 0.10 vol % DMCB (Example 6). The rheology profiles are illustrated in FIG. 3 along with Example 4 (0.05 vol % DMCB), and show that the DMCB can be used to control both the room temperature viscosity as crosslinked by Boron and the ultimate viscosity upon crosslinking with the Zirconium crosslinker used.

Figure 4:
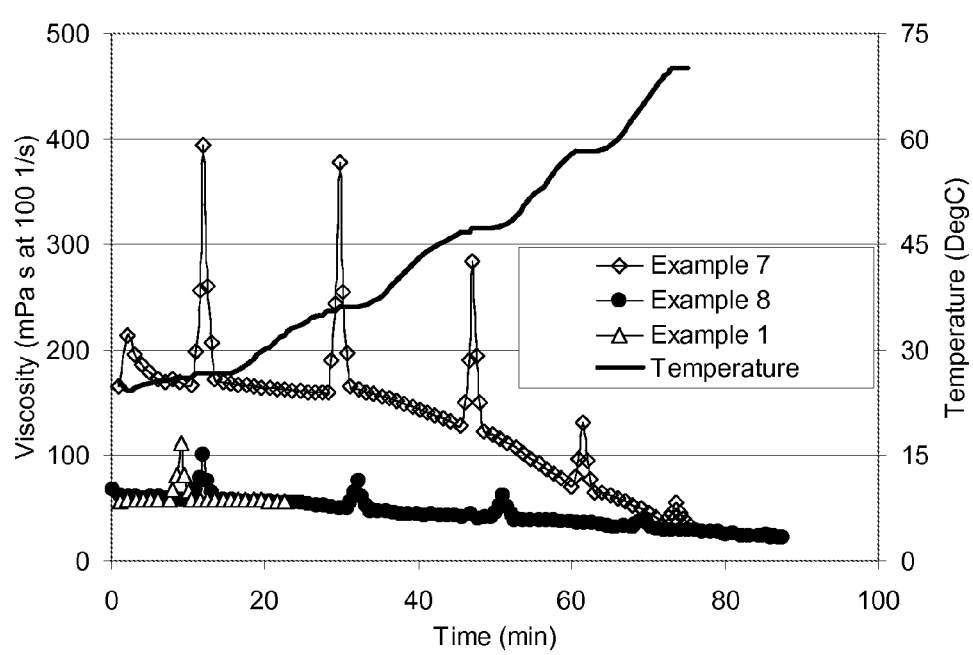
FIG. 4 shows the rheology profile of CMHPG treated with cationic surfactant alone (Example 8), boron crosslinker alone (Example 1), and both cationic surfactant and boron crosslinker together (Example 7), and establishes that the surfactant did not behave as a crosslinker per se in this system, as described in Examples 1, 7 and 8.

Examples 7 and 8 were prepared to evaluate the use of the DMB surfactant as a sole crosslinker, which proved ineffective by itself. In Example 7, the mixture included 30 ppm boron and 0.085 vol % DMB surfactant, a similar composition to that of Example 3, except without any Zr crosslinker. In Example 8, 0.085 vol % DMB surfactant was used, but the boron and Zr were omitted; and these two examples were compared to Example 1, where the mixture included the 30 ppm boron, but did not include surfactant or Zr crosslinker. The resulting rheology profiles for Examples 1, 7 and 8 illustrated in FIG. 4 show that DMB did not crosslink the CMHPG by itself at this relatively low concentrations required for charge screening, and that boron and DMB together were required for effective crosslinking. It is clear from FIG. 4 that the addition of this amount of surfactant to this system in the absence of borate did not increase the viscosity of the fluid noticeably. Only the fluid containing the DMB surfactant was crosslinked by the boron crosslinker and viscosity was improved significantly. In addition FIG. 4 shows that for Example 7, as the temperature increases, the boron crosslinking thermally thins, to reach at 70 deg C. the same viscosity as the non crosslinked fluid in Example 8. This proves that the addition of the surfactant in this system is useful for the purpose of charge screening, but did not form micellar associative crosslinks at these conditions when boron was absent.

Example 9

STEPANQUAT 8358 Surfactant

Figure 5:
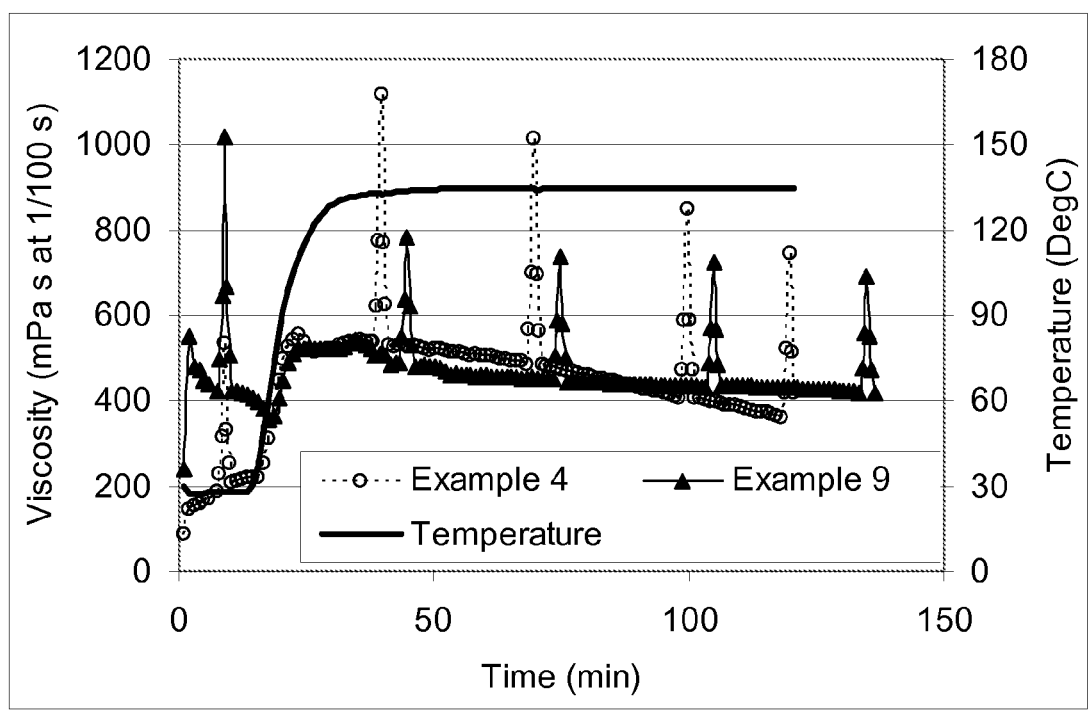
FIG. 5 shows the rheology profile of a CMHPG fluid with boron crosslinker with two different surfactants, DMCB (Example 4) and STEPANQUAT 8358 surfactant (80% quaternary benzyldimethyl cocoalkyl ammonium chloride surfactant) (Example 9) indicating that the rheology can be manipulated by surfactant selection as described in Examples 4 and 9.

Example 4 was repeated except that 0.045 vol % of STEPANQUAT 8358 surfactant (80% quaternary benzyldimethyl cocoalkyl ammonium chloride surfactant) was used in place of the DMCB surfactant. At 24° C., the viscosity of the boron-surfactant crosslinked mixture was 400 mPa s; at 70° C. the zirconium crosslinking had increased the viscosity to 500 mPa s. The rheology profile of Example 9 is compared to that of Example 4 in FIG. 5.

Examples 10-13

Cationic Guar Crosslinking

A cationic guar having a degree of substitution of 0.35 was hydrated in deionized water at 0.36 wt % as described in Example 1. After hydration the pH was increased with 0.15 wt % TEPA, and crosslinked with and without 25 ppm boron from borax, and with and without different surfactants. In Example 10, a linear gel of low viscosity was obtained without any boron or surfactant. In Example 11, the cationic guar was crosslinked with boron and without any surfactant to obtain a gel of moderate viscosity. In Examples 12 and 13, respectively, the cationic guar was crosslinked with boron in the presence of 0.05 wt % sodium dodecylbenzene sulfonate (SDBS) and 0.08 wt % sodium laureth oligoethyleneoxide carboxylate (SLOC), with further viscosity improvements. The results are summarized in Table 2 below.

TABLE 2

Viscosity at 100 sec$^{-1}$ at 1 hr for 0.36 wt % cationic guar

| Example | Boron (ppm) | Surfactant | Surfactant (wt %) | Viscosity (mPa-s) |
|---|---|---|---|---|
| 10 | 0 | none | 0 | 44 |
| 11 | 25 | none | 0 | 90 |
| 12 | 25 | SDBS | 0.05 | 120 |
| 13 | 25 | SLOC | 0.08 | 155 |

These examples show that cationic guar of a relatively high degree of substitution can be charge screened with anionic surfactants to improve boron crosslinking.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of treating a subterranean formation penetrated by a well bore comprising the steps of:
   a. mixing into an aqueous medium a polymer comprising a high degree of pendant ionic moieties, a surfactant comprising oppositely charged moieties, and a borate source, in amounts effective for gel formation, wherein the resulting aqueous mixture has a conductivity less than 10 mS/cm or contains less than 0.5 wt % KCl by weight of the liquid phase;
   b. injecting the aqueous mixture into the well bore;
   c. gelling the aqueous mixture.

2. The method of claim 1 wherein the polymer comprises anionically modified polysaccharide and the surfactant comprises cationic moieties.

3. The method of claim 1 wherein the polymer comprises carboxylated polysaccharide and the surfactant comprises cationic moieties.

4. The method of claim 1 wherein the polymer comprises carboxymethyl guar or carboxymethylhydroxypropyl guar and the surfactant comprises cationic moieties.

5. The method of claim 1 wherein the surfactant is cationic and the polymer is anionic.

6. The method of claim 1 wherein the surfactant is zwitterionic or amphoteric and the polymer is anionic.

7. The method of claim 1 wherein the surfactant comprises an amine functional surfactant and the polymer is anionic.

8. The method of claim 1 wherein the surfactant comprises a quaternary ammonium group surfactant and the polymer is anionic.

9. The method of claim 1 wherein the polymer comprises cationically modified polysaccharide and the surfactant comprises anionic moieties.

10. The method of claim 1 wherein the polymer comprises amine functional polysaccharide having a degree of substitution greater than 0.16 and the surfactant comprises anionic moieties.

11. The method of claim 1 wherein the surfactant is anionic and the polymer is cationic.

12. The method of claim 1 wherein the surfactant is zwitterionic or amphoteric and the polymer is cationic.

13. The method of claim 1 wherein the surfactant comprises a hydrophobic group of from 6 to 32 carbon atoms.

14. The method of claim 1 wherein the surfactant comprises a hydrophobic group of from 6 to 18 carbon atoms.

15. The method of claim 1 wherein the aqueous mixture further comprises a clay stabilizer.

16. The method of claim 1 wherein the aqueous mixture further comprises tetraalkyl ammonium salt of from 4 to 8 carbon atoms in an amount effective for clay stabilization.

17. The method of claim 1 wherein the aqueous mixture further comprises tetramethyl ammonium chloride in an amount effective for clay stabilization.

18. The method of claim 1 wherein the aqueous mixture further comprises a metal crosslinker.

19. The method of claim 1 wherein the aqueous mixture further comprises a complex of a Group 4 metal and a ligand selected from the group consisting of amino and phosphonic carboxylic acids and salts and derivatives thereof.

20. The method of claim 1 wherein the aqueous mixture further comprises a complex of a Group 4 metal and a ligand selected from the group consisting of aspartic acid, glutamic acid and salts and derivatives thereof in a molar ratio of metal to ligand from 1:1 to 1:6.

21. A method of treating a subterranean formation penetrated by a well bore comprising the steps of:
 a. mixing into an aqueous medium a polymer comprising a high degree of pendant anionic moieties, a surfactant comprising cationic moieties, a clay stabilizer, a borate source, and a metal crosslinker, in amounts effective for gel formation, wherein the resulting aqueous mixture has a pH from 8.5 to 12.5, and wherein the aqueous mixture has a conductivity less than 10 mS/cm or a KCl concentration less than 0.5 percent by weight of the liquid phase;
 b. injecting the aqueous mixture into the well bore;
 c. initiating a first gelling of the aqueous mixture with reversible crosslinking at a high shear condition;
 d. thereafter initiating a second gelling of the aqueous mixture with persistent crosslinking for low shear conditions.

22. The method of claim 21 wherein the polymer comprises carboxymethylhydroxypropyl guar, the surfactant comprises a quaternary ammonium group surfactant with a hydrophobic group of from 6 to 18 carbon atoms, the clay stabilizer comprises tetramethyl ammonium chloride, and the metal crosslinker comprises a complex of a Group 4 metal and a ligand selected from the group consisting of amino and phosphonic carboxylic acids and salts and derivatives thereof.

23. A method of treating a subterranean formation penetrated by a well bore comprising the steps of:
 a. mixing into an aqueous medium a polymer comprising pendant cationic moieties and a degree of substitution greater than 0.16, a surfactant comprising anionic moieties, a clay stabilizer, a borate source, and a metal crosslinker, in amounts effective for gel formation, wherein the resulting aqueous mixture has a pH from 8.5 to 12.5, and wherein the aqueous mixture has a conductivity less than 10 mS/cm or a KCl concentration less than 0.5 percent by weight of the liquid phase;
 b. injecting the aqueous mixture into the well bore;
 c. initiating a first gelling of the aqueous mixture with reversible crosslinking at a high shear condition;
 d. thereafter initiating a second gelling of the aqueous mixture with persistent crosslinking for low shear conditions.

24. The method of claim 23 wherein the polymer comprises a highly substituted cationically modified guar, the surfactant comprises a sulfate group surfactant with a hydrophobic group of from 6 to 18 carbon atoms, the clay stabilizer comprises tetramethyl ammonium chloride, and the metal crosslinker comprises a complex of a Group 4 metal and a ligand selected from the group consisting of amino and phosphonic carboxylic acids and salts and derivatives thereof.

25. An aqueous fluid comprising:
 i. a polymer comprising a high degree of pendant ionic moieties,
 ii. a surfactant comprising oppositely charged moieties,
 iii. a clay stabilizer,
 iv. a borate source, and
 v. a metal crosslinker,
 vi. in an aqueous mixture having a pH from 8.5 to 12.5 and wherein the aqueous mixture has a conductivity less than 10 mS/cm or a KCl concentration less than 0.5 percent by weight of the liquid phase, and,
 vii. wherein the polymer, surfactant, stabilizer, borate source and metal crosslinker are present in amounts effective to form a gel having a rheology profile comprising:
  A. reversible shear viscosity recovery at a first condition comprising a temperature below 40° C.; and
  B. a shear-sensitive persistent viscosity at a second condition comprising an elevated temperature with respect to the first condition and a pH sensitivity slope of 30° C. per pH unit or less.

* * * * *